United States Patent

Battershell et al.

[11] 3,887,657
[45] June 3, 1975

[54] PHOSPHORAMIDOTHIOATE ESTERS

[75] Inventors: Robert D. Battershell; Russell M. Bimber, both of Painesville; Janis A. Bungs, Willoughby, all of Ohio

[73] Assignee: Diamond Shamrock Corporation, Cleveland, Ohio

[22] Filed: Jan. 14, 1974

[21] Appl. No.: 433,219

[52] U.S. Cl............. 260/938; 260/455 P; 424/210; 424/211; 424/212
[51] Int. Cl.......... A01n 9/36; C07f 9/16; C07f 9/24
[58] Field of Search..................... 260/938

[56] References Cited
UNITED STATES PATENTS
3,393,253  7/1968  Wiesboeck.......................... 260/938
FOREIGN PATENTS OR APPLICATIONS
3,918,119  8/1964  Japan................................. 260/938

Primary Examiner—Lorraine A. Weinberger
Assistant Examiner—Richard L. Raymond
Attorney, Agent, or Firm—William A. Skinner

[57] ABSTRACT

Phosphoramidothioate esters having the structure

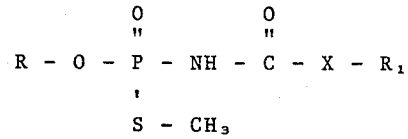

are useful in the control of pests such as insects and arachnids. The compositions exhibit outstanding activity against houseflies.

3 Claims, No Drawings

PHOSPHORAMIDOTHIOATE ESTERS

FIELD OF THE INVENTION

This invention relates to organic compounds useful as pesticides, and more particularly to phosphoramidothioate esters having pesticidal properties.

SUMMARY OF THE INVENTION

It has been found that a group of novel phosphoramidothioate esters are particularly effective in controlling insects and arachnids. The phosphoramidothioate esters of this invention have the structural formula

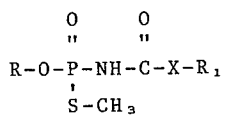

wherein R is an alkyl group preferably having 1 to 5 carbon atoms;

X may be oxygen or sulfur; and $R_1$ is aryl or substituted aryl.

In those instances where $R_1$ is a substituted member, reppresentative substituents include alkyl, halo, nitro, cyano, alkoxy, phenoxy, alkylthio, phenylthio, dialkylamino, carboxy, carbalkoxy, sulfonic and sulfonamido.

The compounds of the present invention are generally prepared by the following reaction

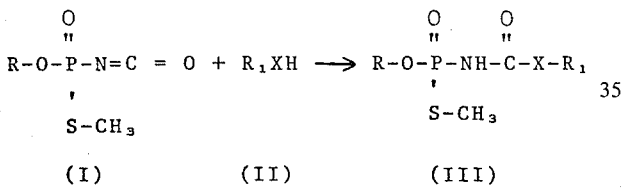

wherein R, $R_1$ and X are as described hereinabove. Preferably the reaction is carried out by adding freshly distilled O-alkyl-S-methyl phosphoroisocyanatothioate (I), prepared by method 'B' of L. I. Samarai et al, Zhur. Obschchei Khimii 39, 1712–1715 (1969), to an approximately equimolar solution of (II) in a non-protic solvent, typically ether, benzene or chloroform, with stirring and cooling. The product (III) often precipitates from solution and is isolated in substantially pure form by filtering and rinsing. If gummy, lumpy or non-uniform in appearance the solid is triturated with fresh solvent and rinsed again.

When the product (III) does not precipitate readily, or an oil separates, the solution is checked by infrared spectroscopy to determine whether the reaction is complete (indicated by disappearance of the isocyanate absorption band near 2270 cm$^{-1}$). If the reaction is complete, solvent is removed under vacuum at or below 30°C. Solid product is usually obtained at this point.

If the infrared analysis indicates that the reaction is not complete within two hours, about 1 to 2 mole percent of a sodium hydride oil dispersion is added and the mixture is allowed to stand for 12–24 hours. The reaction is generally completed after this period, and the product is recovered as before. The purity and identity of the products are confirmed by elemental, infrared, and NMR analysis.

DESCRIPTION OF THE PREFERRED EMBODIMENTS

Preferred phosphoramidothioate esters of this invention include those wherein R is alkyl of 1 to 5 carbon atoms, preferably methyl or ethyl, X is oxygen or sulfur, and $R_1$ is aryl or substituted aryl. Particularly preferred are those in which R is methyl, X is oxygen, and $R_1$ is phenyl or substituted phenyl. Preferred substituents on the phenyl are alkyl of 1 to 5 carbon atoms, alkoxy, halogen, aryl, fused aryl, phenoxy and alkylthio.

Representative compounds of the above include the following, to which compound numbers have been assigned and are used throughout the remainder of this specification:

1. O,S-dimethyl-N-(carbophenoxy)phosphoramidothioate
2. O,S-dimethyl-N-(carbo-2-phenylphenoxy)phosphoramidothioate
3. O,S-dimethyl-N-(carbo-2,3-dimethoxyphenoxy)phosphoramidothioate
4. O,S-dimethyl-N-(carbo-3,4-dimethylphenoxy)phosphoramidothioate
5. O,S-dimethyl-N-(carbo-3-methylphenoxy)phosphoramidothioate
6. O-ethyl-S-methyl-N-(carbophenoxy)-phosphoramidothioate
7. O-ethyl-S-methyl-N-(carbophenylthio)-phosphoramidothioate
8. O,S-dimethyl-N-(carbo-4-phenylphenoxy)-phosphoramidothioate
9. O,S-dimethyl-N-(carbo-4-methoxyphenoxy)-phosphoramidothioate
10. O,S-dimethyl-N-(carbo-2,4-dimethylphenoxy)-phosphoramidothioate
11. O,S-dimethyl-N-(carbo-3,5-dimethylphenoxy)-phosphoramidothioate
12. O,S-dimethyl-N-(carbo-α-naphthoxy)-phosphoramidothioate
13. O,S-dimethyl-N-(carbo-2,6-di-tert butyl-4-methylphenoxy)-phosphoramidothioate Further examples of compounds of this invention include:

O,S-dimethyl-N-(carbo-3,4-methylenedioxyphenoxy)-phosphoramidothioate
O,S-dimethyl-N-(carbo-2,6-dimethylphenoxy)-phosphoramidothioate
O,S-dimethyl-N-(carbo-2,6-dimethoxyphenoxy)-phosphoramidothioate
O,S-dimethyl-N-(carbo-4-methylthio-2,6-dimethylphenoxy)-phosphoramidothioate
O,S-dimethyl-N-(carbo-4-methylthio-3,5-dimethylphenoxy)-phosphoramidothioate
O-ethyl-S-methyl-N-(carbo-2,3-dimethoxyphenoxy)-phosphoramidothioate
O-ethyl-S-methyl-N-(carbo-2-phenylphenoxy)-phosphoramidothioate
O-ethyl-S-methyl-N-(carbo-3,4-dimethylphenoxy)-phosphoramidothioate
O-ethyl-S-methyl-N-(carbo-2-chlorophenylthio)-phosphoramidothioate
O-ethyl-S-methyl-N-(carbo-4-chlorophenylthio)-phosphoramidothioate
O-ethyl-S-methyl-N-(carbo-3-methoxyphenylthio)-phosphoramidothioate
O-ethyl-S-methyl-N-(carbo-4-methoxyphenylthio)-phosphoramidothioate O-ethyl-S-methyl-N-(carbo-4-methylphenylthio)-
phosphoramidothioate
and the like.

For a fuller understanding of the nature and objects of this invention, reference may be made to the following examples which are given to illustrate the invention and are not to be construed in a limiting sense. The infrared spectrum for each product described herein is consistent with the assigned structure. All percentages, proportions, and quantities given in these examples are by weight unless otherwise indicated. Likewise, all references to temperature are as °C. unless otherwise indicated.

Preparation of representative compounds of this invention is illustrated by the following examples.

EXAMPLE 1

1. O,S-dimethyl-N-(carbophenoxy) phosphoramidothioate

Phenol (2.35 grams, 0.025 mole) was dissolved in 50 ml benzene and O,S-dimethyl phosphorisocyanatothioate (4.0 grams, 0.025 mole) was added. The solution was allowed to stand at ambient temperature for 3 days, then the solvent was removed using a rotary evaporator at room temperature. Product crystallized after 12 hours standing, was slurried with ether, removed by filtration and dried. Rewashing with water left 1.5 g (24% yield) white solid melting at 68°-73°C. The product had an infrared spectrum showing bands characteristic of N—H, C—H, C=O, and P=O bonds.

Analysis: % Calculated: C, 41.4; H, 4,63; N, 5.36. % Found: C, 40.76; H, 4.54; N, 5.41.

EXAMPLE 2

2. O,S-dimethyl-N-(carbo-2-phenylphenoxy)phosphoramidothioate

2-Phenylphenol (4.25 grams, 0.025 mole) was dissolved in 50 ml. ether and a trace of sodium hydride was added. O,S-dimethyl phosphorisocyanatothioate (4.0 grams, 0.024 mole) was added and the solution was allowed to stand for 24 hours. The solvent was evaporated and the residue was slurried with ether, removed by filtration and dried. This was given a final water wash and dried, leaving 6.5g (80% yield) of white solid, m.p. 88°-94°C. The IR spectrum was consistent with the expected product.

Analysis: % Calculated: C, 53.41; H, 4.78; N, 4.15.
% Found: C, 53.85; H, 4.91; N, 4.24.

EXAMPLE 3

3. O,S-dimethyl-N-(carbo-2,3-dimethoxyphenoxy) phosphoramidothioate 2,3-Dimethoxy phenol (3.85 grams, 0.025 mole) was dissolved in 25 ml ether, a trace of sodium hydride mixed in, then O,S-dimethyl phosphoroisocyanatothioate (4.0 grams, 0.024 mole) was added. After 24 hours the solid which had precipitated was removed, broken up in a mortar, slurried with ether, filtered and dried. After a final water wash and drying, 4.2g (55% yield) of white solid, m.p. 88°-96°C. was obtained. Its IR spectrum was consistent with the expected product.

Analysis: % Calculated: C, 41.12; H, 5.02; N, 4.36.
% Found: C, 40.76; H, 5.01; N, 4.44.

EXAMPLE 4

4. O,S-dimethyl-N-(carbo-3,4-dimethylphenoxy) phosphoramidothioate 3,4-dimethylphenol (3.05 grams, 0.025 mole) was dissolved in 25 ml ether and a trace of sodium hydride was added. Then O,S-dimethyl phosphoroisocyanatothioate (4.0 grams, 0.024 mole) was added. After 24 hours at ambient temperature the solvent was evaporated, the solid residue was crushed in ether, filtered out and dried, giving 2.3g (33% yield) of white solid, m.p. 60°-64°C.(dec.). The IR spectrum of the white solid was consistent with the expected structure.

Analysis: % Calculated C, 45.67; H, 5.57; N, 4.84.
% Found C, 45.24; H, 5.56; N, 5.04.

Table I lists representative compounds prepared by the procedure described hereinabove.

TABLE I $$\begin{array}{c} \text{O} \quad\quad \text{O} \\ \| \quad\quad \| \\ \text{R}-\text{O}-\text{P}-\text{NH}-\text{C}-\text{X}-\text{R}_1 \\ | \\ \text{S}-\text{CH}_3 \end{array}$$

| Compound | R | X | R₁ | Melting Point (°C) | Analysis | % Calculated | % Found |
|---|---|---|---|---|---|---|---|
| 1 | CH₃ | O | 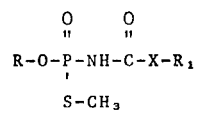 | 68-73 | C | 41.40 | 40.76 |
| | | | | | H | 4.63 | 4.54 |
| | | | | | N | 5.36 | 5.41 |
| 2 | CH₃ | O | 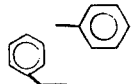 | 88-94 | C | 53.41 | 53.85 |
| | | | | | H | 4.78 | 4.91 |
| | | | | | N | 4.15 | 4.24 |
| 3 | CH₃ | O | 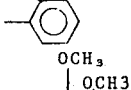 | 88-96 | C | 41.12 | 40.76 |
| | | | | | H | 5.02 | 5.01 |
| | | | | | N | 4.36 | 4.44 |

TABLE I (Continued)

| | | | | | | | |
|---|---|---|---|---|---|---|---|
| 4 | $CH_3$ | O | 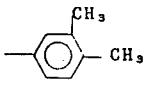 | 60-64 (dec.) | C H N | 45.67 5.57 4.84 | 45.24 5.56 5.04 |
| 5 | $CH_3$ | O | 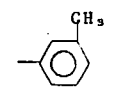 | 75-82 | C H N | 43.63 5.13 5.09 | 43.41 5.22 5.17 |
| 6 | $CH_3CH_2$ | O | 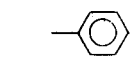 | 71-73 | C H N | 42.63 5.09 5.09 | 42.6 5.3 5.4 |
| 7 | $CH_3CH_2$ | S | 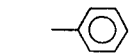 | 77-79 | C H N | 41.23 4.81 4.81 | 41.2 4.9 4.82 |
| 8 | $CH_3$ | O | 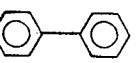 | 98-108 | C H N | 53.41 4.78 4.15 | 54.25 5.02 4.12 |
| 9 | $CH_3$ | O | 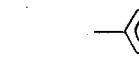 | 75-79 | C H N | 41.24 4.85 4.81 | 41.20 4.82 5.26 |
| 10 | $CH_3$ | O | 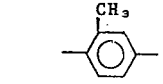 | 103-108 | C H N | 45.67 5.57 4.84 | 45.12 5.61 5.27 |
| 11 | $CH_3$ | O |  | 74-79 | C H N | 45.67 5.57 4.84 | 45.22 5.99 5.15 |
| 12 | $CH_3$ | O | 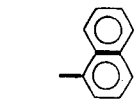 | 97-102 | C H N | 50.23 4.54 4.51 | 49.93 4.57 4.84 |
| 13 | $CH_3$ | O | 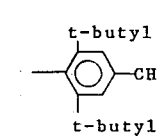 | 130-132 | C H N | 55.79 7.80 3.61 | 55.75 7.69 3.87 |

The following tests illustrate utility of the compounds. As previously mentioned, the compositions of the present invention are pesticides which are useful in controlling various insect species. Selected phosphoramidothioate esters were evaluated for biological activity against the following representative pests: Mexican bean beetle (*Epilachna varivestis*), Southern army worm (*Prodenia eridonia*), housefly (*Musca domestica*), bean aphid (*Aphis fabae*), and red spider mite (*Tetranychus sp.*). The last two pests were treated both by contact and systemic application.

Bean Aphid Spray and Systemic Test

This test determines the insecticidal activity of the compound being tested against the bean aphid *Aphis fabae*. Stock formulations containing 500 ppm of each test chemical are prepared using 0.05 g of the test chemical (or 0.05 ml if a liquid), 4.0 ml acetone containing 0.25% (V/V) Triton X-155, and 96.0 ml deionized water and are used in both soil drench and spray treatments. The stock formulations are diluted to obtain the appropriate lower concentrations maintaining the concentration level of all adjuvants. The bean aphid is cultured on nasturtium plants (var. Tall Single), no attempt being made to select insects of a given age in these tests. Single nasturtium test plants growing in soil in individual 2¼ inch fiber pots are then infested with populations of 100 to 200 aphids.

In the spray application, 50 ml of stock or diluted formulation is uniformly sprayed onto the plants. In the systemic application, 11.2 ml of stock or diluted formulation is applied to the soil containing the plant. A dosage of 11.2 ml of formulation containing 500 ppm of test chemical is equivalent to a dosage of the test chemical of 16 pounds per acre.

The plant test units under fluorescent lights are given bottom watering for the duration of the test. Percentage mortality is determined 3 days after treatment. Results of this test are shown in Table II as A (aphid contact spray) and AS (aphid systemic soil drench).

Red Spider Mite Spray and Systemic Test

This test determines the acaricidal activity of the compound being tested against the red spider mite, *Tetranychus sp.* Stock formulations containing 500 ppm of each test chemical are prepared by the procedure described earlier and are used in both the soil drench and spray treatments. The stock culture of mites is maintained on Scarlet runner bean foliage. Approximately 18 to 24 hours before testing, mites are transferred to the primary leaves of two Lima bean plants (var. Sieva) grown in 2¼ inch pots.

The spray and systemic application methods described earlier are used to apply the test formulations to the infested plants and soil. After 3 days, two of the four leaves treated are examined and mite mortality is determined. Should a compound be an effective miticide, the other two leaves are available to obtain information on the residual activity of the formulation. Results of this test are shown in Table II as M (mite contact spray test) and MS (mite systemic soil drench test).

Housefly Spray Test

This test determines the insecticidal activity of the compound being tested against adult houseflies, *Musca domestica*. Stock formulations containing 500 ppm of each test chemical are prepared using the procedure described earlier and are diluted to obtain the appropriate lower concentrations.

Then adult flies are placed in a cylindrical screen cage 1½ by 4 inches made of 20-mesh stainless steel screening and are sprayed with 50 ml of the stock or diluted formulation. The flies are supplied food and drink from a dextrose solution by draping a paper wich over the outside of the screen cylinder and are able to feed and drink ad libitum. Percent mortality obtained is determined three days after treatment. Results of this housefly spray test are shown in Table II as HF.

Southern Army Worm Spray Test

Paired fully expanded primary leaves excised from Scarlet runner bean plants are maintained in plastic tubes containing water and sprayed with the test formulation prepared as described. After the spray deposit on the leaves is dry, the paired leaves are separated. One leaf is placed onto 1.5 percent water agar and infested with 10 newly hatched Southern army worm larvae. The covered test receptacle is held at 72°F for 3 days and then the percent mortality is determined. Results of this test are shown in Table II as AW (Southern army worm spray test).

Mexican Bean Beetle Leaf Spray Test

This test determines the insecticidal activity of the compound being tested against the Mexican bean beetle (*Epilachna varivestis*). This test procedure is the same as that described for the Sourthern army worm with the exception that one-day old larvae of the Mexican bean beetle instead of newly hatched Southern army worm larvae are used.

These tests are held at 72°F for 3 days after which mortality is determined. Results of this test are shown in Table II as BB (Mexican bean beetle leaf spray test).

Each test compound is rated using the following scale:

| Contact Activity | | Systemic Activity | |
|---|---|---|---|
| Rating Number | 50% mortality at concentration (parts per million) | Rating Number | 50% mortality at concentration (pounds per acre) |
| 2 | >128 | 2 | >4 |
| 3 | 128–64 | 3 | 4–2 |
| 4 | 64–32 | 4 | 2–1 |
| 5 | 32–16 | 5 | 1–½ |
| 6 | 16–8 | 6 | ½–¼ |
| 7 | 8–4 | 7 | ¼–⅛ |
| 8 | 4–2 | 8 | ⅛–1/16 |
| 9 | 2–1 | 9 | 1/16–1/32 |
| 10 | 1–0.5 | 10 | 1/32–1/64 |
| 11 | 0.5–0.25 | | |
| | 0.25–0.125 | | |

TABLE II

| Compound Number | BB | AW | HF | M | A | MS | AS |
|---|---|---|---|---|---|---|---|
| 1 | 5 | 3 | 10 | 6 | 5 | 6 | 5 |
| 2 | 3 | 3 | 11 | 6 | 4 | 5 | 5 |
| 3 | 5 | 4 | 12 | 6 | 4 | 6 | 6 |
| 4 | 5 | 3 | 11 | 5 | 5 | 6 | 6 |
| 5 | 6 | 4 | 9 | 6 | 4 | 6 | 5 |
| 6 | 5 | 3 | 7 | 4 | 5 | 6 | 4 |
| 7 | 5 | 3 | 8 | 5 | 5 | 4 | 4 |
| 8 | 4 | 3 | 10 | 7 | 4 | 6 | 5 |
| 9 | 5 | 3 | 10 | 6 | 4 | 6 | 5 |
| 10 | 5 | 3 | 10 | 5 | 5 | 6 | 6 |
| 11 | 5 | 3 | 10 | 5 | 5 | 6 | 5 |
| 12 | 5 | 3 | 10 | 5 | 5 | 6 | 4 |
| 13 | 2 | 2 | 5 | 2 | 2 | 2 | 2 |

For practical use as a pesticide, the phosphoramidothioate esters of the present invention are generally incorporated into an insecticidal composition which comprises an inert carrier and an insecticidally effective amount of the compound. Such compositions, usually known in the art as formulations, enable the active compound to be conveniently applied to the locus of the pest infestation in any desired quantity. Although the phosphoramidothioate esters may be utilized in undiluted form, it is usually desirable to apply these compounds in admixture with either solid or liquid inert, pesticidal adjuvants. For example, the compounds can be applied to plants for pesticidal purposes by spraying the plants with aqueous or organic solvent dispersions of the compounds. Choice of an appropriate solvent is determined by factors such as concentration of active ingredient, the volatility required in the solvent, cost of the solvent, and nature of the material being treated.

Solvents which can be employed as carriers for these compounds include hydrocarbons such as benzene, toluene, xylene, kerosene, diesel oil, fuel oil, hydrocarbons, and naphthas; ketones such as acetone, methyl ethyl ketone and cyclohexanone; chlorinated hydrocarbons such as trichloroethylene and perchloroethylene; esters such as ethyl acetate, amyl acetate and butyl acetate; ethers of ethylene glycol such as the monomethyl and monoalkyl ethers of diethylene glycol, the monoethyl ether of propylene glycol; alcohols such as ethanol, isopropanol, pentanols, and the like.

These compounds can also be applied to plants and other materials in conjunction with inert solid adjuvants or carriers such as talc, pyrophyllite, attapulgite, chalk, diatomaceous earth, koalinite, montmorillonite, other silicates, silica, lime, calcium carbonate, certain organic carriers such as walnut shell flour, wood flour, ground corn cobs, and the like.

It is often desirable to use a surfactant (a surface active agent) in pesticidal compositions. An anionic, nonionic or cationic surfactant can be used in the formulation of either solid or liquid compositions. Typical surfactants include alkyl sulfonates, alkylaryl sulfonates, alkyl sulfates, alkylamide sulfonates, alkylaryl polyether alcohols, fatty acid esters of polyhydric alcohols, ethylene oxide addition products of these esters; ethylene oxide addition products of long-chain mercaptans; sodium alkyl benzene sulfonates having 12 to 18 carbon atoms; ethylene oxide addition products of alkylphenols, such as phenol condensed with 10 moles of ethylene oxide; cetyl pyridinium chloride; and soaps such as sodium stearate and sodium oleate.

Solid and liquid formulations can be prepared by any suitable method. Solid active ingredients, in finely divided form, can be tumbled together with a finely divided solid carrier. Alternatively, the active ingredient in liquid forms such as solutions, dispersions, emulsions or suspensions, can be admixed with the solid carrier in finely divided form in amounts small enough to preserve the free-flowing property of the final dust compositions.

When solid formulations are used, in order to obtain a high degree of coverage with a minimum dosage, it is desirable that the formulation be in the form of a finely divided powder or dust sufficiently fine that substantially all of the solids will pass through a Tyler sieve having a mesh size between about 20 and about 200.

In dust formulations, the active ingredients can be present in an amount of 5 to 50% of the total weight. However, concentrations outside this range are operative and compositions containing from 1 to 99% of active ingredient by weight are contemplated wherein the remainder is carrier and/or any other desired additive or adjuvant. It may be advantageous to add a small amount of surfactant, e.g., 0.5 to 1% by weight based on the total weight of the dust formulation.

For spray application, the active ingredient may be dissolved or dispersed in a liquid carrier, such as water or other suitable liquid. The active ingredient can be added in the form of a solution, suspension, dispersion or emulsion in aqueous or nonaqueous medium. Desirably, 0.5 to 1.0% by weight of surfactant is present in the liquid composition.

For adjuvant purposes, any desired quantity of surfactant may be employed, such as up to 250% by weight of the active ingredient. If the surfactant is used only to impart wetting qualities to a spray solution, as little as 0.05% or less, by weight of the surfactant need be used. Larger quantities of surfactant are used because of biological behavior of the surfactant rather than its wetting properties. These considerations are particularly important in the treatment of plants. The active ingredients in liquid formulations often may not be more than 30% by weight of the total and may be 10% by weight or even as low as 0.01% by weight.

For systemic application, it may be desirable to apply the pesticide to the soil in the form of granules of an inert material coated with or incorporating the active ingredient. Reasons for the use of pesticidal granules include elimination of water during application, reduction of drift, penetration through vegetative coverage, easy handling, storage, and increased safety to handlers of the pesticides. Useful granule base materials include attapulgite, montmorillonite, corn cobs, walnut shells, and expanded vermiculites. Depending on their physical properties, the pesiticides are either directly sprayed on the preformed granular base or are dissolved in a suitable solvent and then sprayed onto the granular base after which the solvent is removed by evaporation. Granule base materials are usually 60 to 14 U.S. sieve size particles, although other size particles may also be used.

Further, these compounds may not only be applied alone or in mixtures of other compounds of the disclosed class, but may also be used in combination with other active toxicants in the formulation of useful compositions for control of pests. The compounds with or without a suitable carrier or diluent may be applied in toxic amounts to any environmental area or habitat which is a host to insect pests or susceptible to insect attack. For example, compositions may be sprayed or otherwise directly applied to a plant or other host, may be applied to the plant seed, sprayed upon the soil or other immediate plant environment, or used in similar ways so as to effect a contact, stomach, gaseous, or systemic action for the control of insects.

The terms "pesticide" and "pesticidal" as used herein are intended to refer to the killing and/or control of insects, mites, nematodes, or the like. It will be appreciated that applications commonly referred to as insecticidal, miticidal, nematocidal, or the like are contemplated in the employment of these terms. The terms "insecticide" and "insect" as used herein refer to their broad and commonly understood usage rather than to those creatures which in the strict biological sense are classified as insects. Thus, the term insect is used not only to include small invertebrate animals belonging to the class INSECTA but also to other related classes of arthropods whose members are segmented invertebrates having more or fewer than six legs, such as spiders, mites, ticks, centipedes, worms and the like.

It is to be understood that although the invention has been described with specific reference to particular embodiments thereof, it is not to be so limited, since changes and alterations therein may be made which are within the full intended scope of this invention as defined by the appended claims.

What is claimed is:

1. A compound of the formula

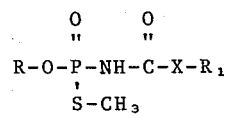

where R is alkyl of 1 to 5 carbon atoms;
X is oxygen; and
$R_1$ is phenyl or substituted phenyl wherein the substituents are selected from alkyl of 1 to 5 atoms, alkoxy of 1 to 5 carbon atoms, halogen, phenyl, napthyl, phenoxy, alkylthio of 1 to 5 carbon atoms, nitro, cyano, phenylthio, dialkylamino of 1 to 5 carbon atoms in each alkyl, carboxyl, carbalkoxy of 1 to 5 carbon atoms, sulfonic, and sulfonamido.

2. The compound of claim 1 wherein the substituent on $R_1$ is selected from alkyl of 1 to 5 carbon atoms, alkoxy of 1 to 5 carbon atoms, halogen, phenyl, napthyl, phenoxy, and alkylthio of 1 to 5 carbon atoms.

3. A compound of claim 1 selected from the group consisting of

O,S-dimethyl-N-(carbophenoxy) phosphoramidothioate;

O,S-dimethyl-N-(carbo-2-phenylphenoxy) phosphoramidothioate;

O,S-dimethyl-N-(carbo-2,3-dimethoxyphenoxy) phosphoramidothioate;

O,S-dimethyl-N-(carbo-3,4-dimethylphenoxy) phosphoramidothioate;

O,S-dimethyl-N-(carbo-3-methylphenoxy) phosphoramidothioate.

* * * * *